US006611798B2

(12) United States Patent
Bruhn et al.

(10) Patent No.: US 6,611,798 B2
(45) Date of Patent: Aug. 26, 2003

(54) PERCEPTUALLY IMPROVED ENCODING OF ACOUSTIC SIGNALS

(75) Inventors: Stefan Bruhn, Sollentuna (SE); Susanne Olvenstam, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 09/982,027

(22) Filed: Oct. 19, 2001

(65) Prior Publication Data

US 2002/0049584 A1 Apr. 25, 2002

(30) Foreign Application Priority Data

Oct. 20, 2000  (EP) .............................................. 00850172

(51) Int. Cl.[7] .......................... G10L 19/04; G10L 19/08; G10L 19/10
(52) U.S. Cl. .................... 704/219; 704/200.1; 704/501; 704/504; 704/223; 704/224
(58) Field of Search .............................. 704/200.1, 201, 704/219, 229, 230, 500–504, 224, 222, 223, 220, 205, 264, 265, 268, 269

(56) References Cited

U.S. PATENT DOCUMENTS

| | | | | |
|---|---|---|---|---|
| 5,206,884 A | * | 4/1993 | Bhaskar ....................... | 375/254 |
| 5,307,441 A | | 4/1994 | Tzeng | |
| 5,353,373 A | * | 10/1994 | Drogo de Iacovo et al. .......................... | 704/223 |
| 5,495,555 A | * | 2/1996 | Swaminathan ............... | 704/207 |

(List continued on next page.)

FOREIGN PATENT DOCUMENTS

| EP | 0878790 A | 11/1998 |
|---|---|---|
| EP | 1006510 A | 6/2000 |

OTHER PUBLICATIONS

McCree, A.: "A 14 kb/s wideband speech coder with a parametic highband model", 2000 IEEE International Conference on Acoustics, Speech, and Signal Processing. Proceedings (Cat. No. 00CH37100), Proceedings of 2000 International Conference on Acoustics, Speech and Signal Processing, Istanbul, Turkey, Jun. 5–9, 2000, pp. II1153–II1156, vol. 2, XP002162018 2000, Piscataway, NJ, USA, IEEE, USA ISBN 0–7803–6293–4.

Koishida, K. et al.: "A Wideband CELP Speech Coder at 16 kbit/S Based on MEL–Generalized CEPSTRAL Analysis", Seattle, WA, May 12–15, 1998, New York, NY: IEEE, US, vol. Conf. 23, May 12, 1998, pp. 161–164, XP00084540; ISBN: 0–7803–4429–4.

Watkins, C.R. et al.: "Improving 16 kb/s G.728 LD–CELP Speech Coder for Frame Erasure Channels", Speech Coding Research Department, AT&T Bell Laboratories, Murray Hill, NJ, USA. Abstract, p. 241, Column 2, $2^{nd}$ paragraph.

*Primary Examiner*—Vijay Chawan

(57) ABSTRACT

Encoding an acoustic source signal such that a signal $\hat{z}$ reconstructed from the encoded information has a perceptually high sound quality. The acoustic source signal is encoded into at least one basic coded signal that represents perceptually significant characteristics of the acoustic signal. The encoder can include at least one spectral smoothing unit which receives at least one of the signal components on which the basic coded signal is based and generates in response thereto a corresponding smoothed signal component. At least one enhanced coded signal is then produced from the corresponding smoothed signal. component for transmission. A receiver receives at least one estimate $\hat{P}_E$ of the transmitted signal(s), and a spectral smoothing unit in the receiver produces, on basis of a primary spectrum $\hat{Y}$ decoded from the at least one received estimate $\hat{P}_E$, a smoothed primary decoded spectrum $\hat{Y}_E$. Finally, this signal $\hat{Y}_E$ is used to generate an enhanced estimate $\hat{z}$ of the acoustic source signal. $\hat{Y}_E$.

44 Claims, 4 Drawing Sheets

U.S. PATENT DOCUMENTS

| | | |
|---|---|---|
| 5,526,464 A | 6/1996 | Mermelstein |
| 5,583,962 A * | 12/1996 | Davis et al. ................. 704/229 |
| 5,884,010 A * | 3/1999 | Chen et al. ................. 704/228 |
| 5,920,832 A * | 7/1999 | Wuppermann et al. ..... 704/219 |
| 5,956,686 A | 9/1999 | Takashima et al. |
| 5,966,689 A * | 10/1999 | McCree ....................... 704/226 |
| 6,122,608 A * | 9/2000 | McCree ....................... 704/219 |
| 6,182,030 B1 * | 1/2001 | Hagen et al. ................ 704/201 |

* cited by examiner

PERCEPTUALLY IMPROVED ENCODING OF ACOUSTIC SIGNALS

THE BACKGROUND OF THE INVENTION AND PRIOR ART

The present invention relates generally to encoding of an acoustic source signal such that a corresponding signal reconstructed on basis of the encoded information has a perceived sound quality, which is higher than according to known encoding solutions. More particularly the invention relates to encoding of acoustic signals to produce encoded information for transmission over a transmission medium according to the preambles of claims 1 and 31 respective decoding of encoded information having been transmitted over a transmission medium according to the preambles of claims 15 and 37. The invention also relates to communication system according to claim 44, computer programs according to claims 13 and 29 respectively and computer readable media according to claims 13 and 30 respectively.

There are many different applications for speech codecs (codec=coder and decoder). Encoding and decoding schemes are used for bit-rate efficient transmission of acoustic signals in fixed and mobile communications systems and in videoconferencing systems. Speech codecs can also be utilised in secure telephony and for voice storage.

The trend in fixed and mobile telephony and in videoconferencing is towards improved quality of the reconstructed acoustic signal. This trend reflects the customer expectation that these systems provide a sound quality equal to or better than that of today's fixed telephone network. One way to meet this expectation is to broaden the frequency band for the acoustic signal and thus convey more of the information contained in the source signal to the receiver. It is true that the majority of the energy of a speech signal is spectrally located between 0 kHz and 4 kHz (i.e. the typical bandwidth of a state-of-the-art codec). However, a substantial amount of the energy is also distributed in the frequency band 4 kHz to 8 kHz. The frequency components in this band represent information that is perceived by a human listener as "clearness" and a feeling of the speaker "being close" to the listener.

The frequency resolution of the human hearing decreases with increasing frequencies. The frequency components between 4 kHz and 8 kHz therefore require comparatively few bits to model with a sufficient accuracy. Today there are, nevertheless, no known bit-rate efficient broadband codecs, which provide a reconstructed acoustic signal with a satisfying perceived quality. The existing ITU-T G.722 wideband coding standard, which operates at bit-rates of 48, 56 and 64 kbps merely offers unsatisfying quality, when comparing with the employed bit-rates (ITU-T=International Telecommunication Union, standardisation sector).

The U.S. Pat. No. 5,956,686 describes an adaptive transform coding/decoding arrangement in which the spectrum of an envelope is divided into frequency bands, so that different coding methods can be applied to the envelopes of the individual bands. This makes it possible to exploit different redundancies between the bands of the spectrum envelope. The spectrum envelope is also adjusted to the coding and/or transmission method to compensate for the time fluctuation in each frequency band.

The U.S. Pat. No. 5,526,464 describes a code excited linear prediction coding method where the residual signal is divided into frequency bands. A particular codebook is provided for each band and the size of the codebook decreases with increasing frequency band. The sampling rate is reduced with decreasing frequency in order to reduce the codebook search complexity.

Hence, there exist examples in the art where the applied coding schemes take into consideration the varying properties of different frequency bands. However, the different properties have only been utilised to obtain a bit-efficient coding of the source signal. There are yet no teachings of any special measures taken to compensate for inherent deficiencies in the applied coding when using a coding scheme optimised for a first frequency band for coding signals in a second frequency band.

Today, most speech coding models are designed for narrowband signals (typically 0–4 kHz). If such speech coding models are applied for coding of an acoustic signal having a larger bandwidth, say 0–8 kHz, the coding will only be optimised for a part of the relevant frequency band, namely the lower part.

One reason for this is that the quantisation of coding parameters generally involves correlation in the time domain between a target signal and a reproduced signal. Such correlation will primarily be based on signal matching in the low-frequency region since the higher frequency components of a speech signal have a low power density in comparison to the low frequency components. As a result of this, the high frequency components will be poorly reproduced at the receiver side.

Unfortunately, this poor reproduction cannot be excused either by flaws in the human hearing or by the characteristics of voice signals. When voice sounds are generated, the vocal tract operates as a filter on airwaves originating the lungs. The so-called formants correspond to the resonance frequencies of this filter. In the lower frequency band of a voice, signal the target signal has distinct formants. However, for higher frequencies the formants are more diffuse. Due to the limitations of the speech model used an acoustic signal having a relatively large bandwidth being encoded by means of a conventional narrowband coder will be reproduced as a signal having distinct spectral structure (i.e. peaks and valleys) also in its upper frequency band. A human listener generally perceives an acoustic signal with such characteristics as unnatural and having a metallic like sound.

Occasionally, a secondary coder is applied either to the output signal of the first coder or in parallel with the first coder in order to further increase the quality of the reconstructed signal. If this measure is taken for a conventional narrowband coder when used for encoding a broadband source signal the spectral structure in the high end of the frequency band will occasionally be even more pronounced. While this is desirable for narrowband acoustic signals in terms of improved sound quality, for wideband acoustic signals, however, the effect may be contrary.

SUMMARY OF THE INVENTION

The object of the present invention is therefore to provide an improved coding scheme for acoustic signals, which alleviates the problems above.

According to one aspect of the invention the object is achieved by a method of encoding an acoustic source signal to produce encoded information for transmission over a transmission medium as initially described, which is characterised by the primary coded signal and the target signal each comprising coefficients of which each coefficient represents a frequency component. At least one smoothed signal corresponding to the primary coded signal respective the target signal is produced that is a selectively modified version of the primary coded signal respective the target signal wherein a variation is reduced in the coefficient values representing frequency information above a threshold value.

According to a further aspect of the invention the object is achieved by a computer program directly loadable into the internal memory of a computer, comprising software for controlling the method described in the above paragraph when said program is run on a computer.

According to another aspect of the invention the object is achieved by a computer readable medium, having a program recorded thereon, where the program is to make a computer control the method described in the penultimate paragraph above.

According to still another aspect of the invention the object is achieved by a method of decoding an estimate of an acoustic source signal as initially described, which is characterised by a smoothed primary decoded spectrum comprising coefficients of which each represents a frequency component. The smoothed primary decoded spectrum is a selectively modified version of one of the at least one primary decoded spectrum wherein a variation is reduced in the coefficient values representing frequency information above a threshold value.

According to a further aspect of the invention the object is achieved by a computer program directly loadable into the internal memory of a computer, comprising software for controlling the method described in the above paragraph when said program is run on a computer.

According to another aspect of the invention the object is achieved by a computer readable medium, having a program recorded thereon, where the program is to make a computer control the method described in the penultimate paragraph above.

According to yet another aspect of the invention the object is achieved by a transmitter as initially described, which is characterised in that at least one spectral smoothing unit is devised to produce a smoothed output signal from a primary coded signal by selectively modifying the primary coded signal such that a variation is reduced in coefficient values thereof representing frequency information above a threshold value.

According to yet an additional aspect of the invention the object is achieved by a receiver as initially described, which is characterised in that a smoothed primary decoded spectrum comprises coefficients of which each represents a frequency component. A spectral smoothing unit in the receiver is devised to produce the smoothed primary decoded spectrum by selectively modifying at least one primary decoded spectrum such that a variation is reduced in the coefficient values representing frequency information above a threshold value.

According to yet an additional aspect of the invention the object is achieved by a communication system for transmission of an acoustic source signal from a first to a second node. The communication system includes, in the first node, the proposed transmitter for encoding the acoustic source signal and to produce encoded information. In the second node is included the proposed receiver for receiving the encoded information produced by the transmitter and for decoding an estimate of the encoded information into an estimate of the acoustic source signal. A transmission medium is used for transmitting the at least one enhanced coded signal from the transmitter to the receiver.

The proposed reduction of the variation in coefficient values representing frequency information above a threshold value, in one or more of the signals from which an acoustic signal is to be reconstructed by a receiver, improves the perceived naturalness of typical acoustic signals, such as voice sounds or music. Particularly, the metallic sound generated by the prior-art coding techniques is mitigated to a considerable extent. This is an especially desired effect, since the perceived sound quality will be a key factor in the success of future wide band applications.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 1A:
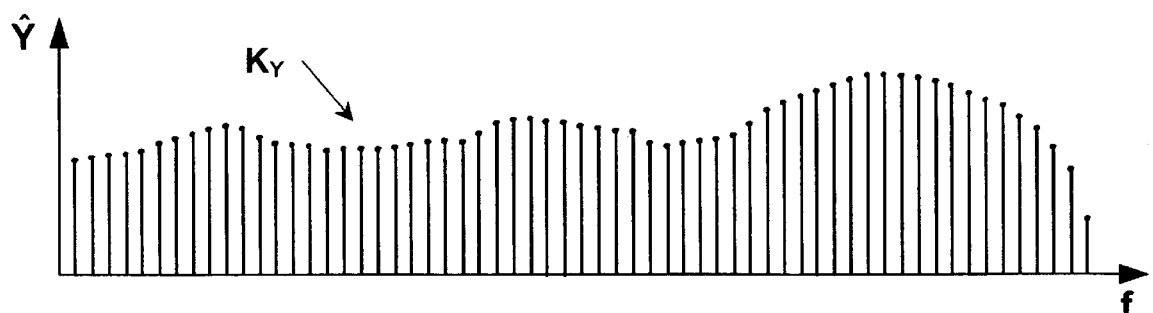
FIG. 1A shows a frequency diagram with coefficients of a primary decoded spectrum where each coefficient represents a frequency component of the acoustic source signal.
Figure 1B:
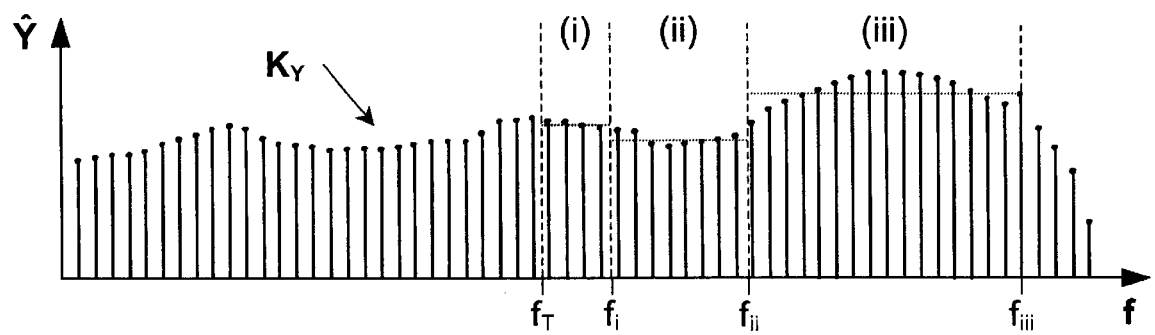
FIG. 1B illustrates how average coefficient values are calculated for the coefficients in FIG. 1A, representing frequency components in frequency bands above a threshold frequency.

FIG. 1A shows, in a frequency diagram, coefficients $K_Y$ of a primary decoded spectrum $\hat{Y}$ along the x-axis. Each coefficient $K_Y$ represents the magnitude of a frequency component of an acoustic source signal having been encoded according to an arbitrary encoding scheme, transmitted over a transmission medium and decoded according to an appropriate decoding scheme. The primary decoded spectrum $\hat{Y}$ thus represents perceptually significant characteristics of the acoustic signal x, FIG. 1B illustrates how the primary decoded spectrum $\hat{Y}$, represented by the coefficients $K_Y$, is divided into frequency bands i, ii and iii above a threshold frequency $f_T$. A first frequency band i includes frequency components between the threshold frequency $f_T$ and a first edge frequency $f_i$, a second frequency band ii includes frequency components between the first edge frequency $f_i$ and a second edge frequency $f_{ii}$ and a third frequency band iii includes frequency components between the second edge frequency $f_{ii}$ and a third edge frequency $f_{iii}$. A respective dotted line in each of the frequency bands i, ii and iii illustrates an arithmetic average coefficient value for the frequency band in question. In an alternative embodiment of the invention a median coefficient value is determined instead of the arithmetic average value.

Figure 1C:
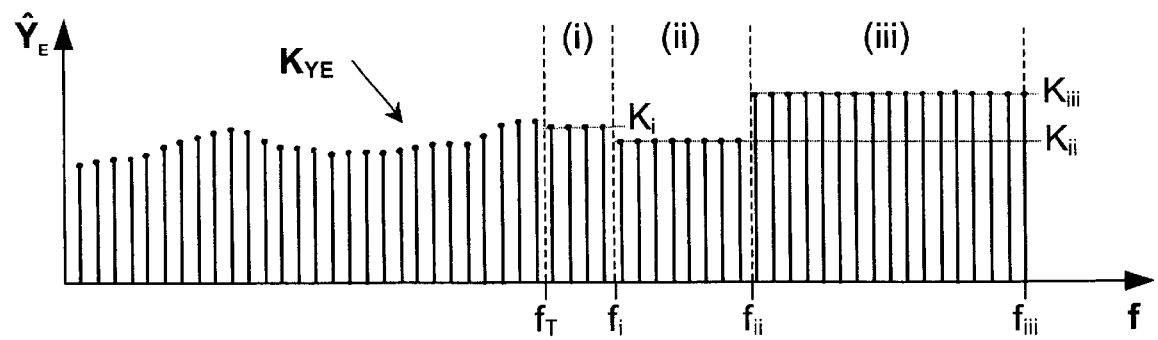
FIG. 1C illustrates how the average coefficient values of FIG. 1B replace the original coefficient values for the frequency components in the frequency bands above the threshold frequency.

A smoothed primary decoded spectrum $\hat{Y}_E$ is generated as a selectively modified version of the primary decoded spectrum $\hat{Y}$ wherein a variation is reduced in the coefficient values $K_{YE}$ representing frequency information above the threshold value $f_T$. FIG. 1C shows an example in which the average coefficient values $K_i$, $K_{ii}$ respective $K_{iii}$ of FIG. 1B replace the original coefficient values for the frequency components in the frequency bands i, ii and iii above the threshold frequency $f_T$ and whereby said reduction in the variation in the coefficient values $K_{YE}$ is accomplished.

The FIGS. 1B and 1C show an embodiment of the invention where the frequency bands i, ii, and iii are non-overlapping and have different bandwidths. Since the resolution of the human hearing approximately decreases according to a logarithmic relationship with increasing frequency it is reasonable from a perceptual point of view to divide the frequency bands i, ii, and iii according to a logarithmic frequency scale. The Bark scale, for instance, divides the spectrum by means of the following edge frequencies 0 kHz, 0,1 kHz, 0,2 kHz, 0,3 kHz, 0,4 kHz, 0,51 kHz, 0,63 kHz, 0,77 kHz, 0,92 kHz, 1,08 kHz, 1,27 kHz, 1,48 kHz, 1,72 kHz, 2 kHz, 2,32 kHz, 2,7 kHz, 3,15 kHz, 3,7 kHz, 4,4 kHz, 5,3 kHz, 6,4 kHz, 7,7 kHz, 9,5 kHz, 12 kHz and 15,5 kHz. The Mel cepstrum scale defines an alternative set of frequency bands aiming at resembling the critical bands of human hearing. The perceptual linear prediction-method (PLP) provides yet another means to obtain a set of frequency bands representing a perceptually motivated scaling and compression of the spectrum.

Of course, the frequency bands may also be equidistant or there may be just one single frequency band covering the entire spectrum above the threshold frequency $f_T$.

Moreover, irrespective of the frequency bands' relative bandwidth, neighbouring frequency bands may at least partly overlap each other. If this is the case, the coefficients within each frequency band must be multiplied with a window function before resulting coefficient values in the overlapping regions of the frequency bands can be derived by adding the relevant coefficient values together.

Figure 2A:
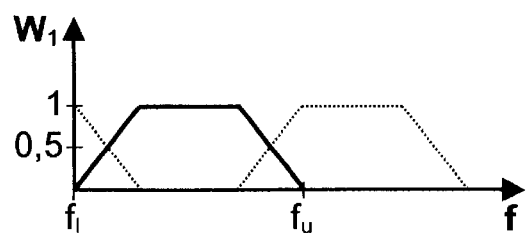
FIG. 2A shows a first example of a window function to be used for adding coefficient values in overlapping frequency bands.

FIG. 2A shows a first example of such a window function $W_1$ having a trapezium shape and being defined between a lower edge frequency $f_l$ and an upper edge frequency $f_u$. The window function $W_1$ has a constant magnitude, e.g. 1, in non-overlapping frequency regions and has a gradually declining magnitude in a lower transition region and a corresponding upper transition region where neighbouring frequency bands overlap. The magnitude of the window function $W_1$ is preferably equal to half the constant magnitude (e.g. 0.5) at the middle point of the respective transition region. The middle point must, of course, be defined with respect to any non-linear frequency scale used.

Figure 2B:
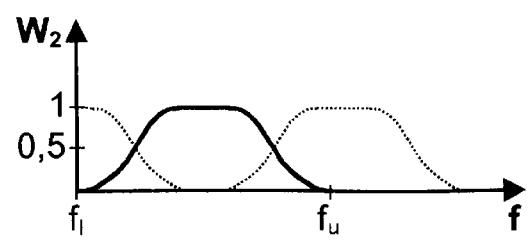
FIG. 2B shows a second example of a window function to be used for adding coefficient values in overlapping frequency bands.

FIG. 2B shows another example of a window function $W_2$ to be used for adding coefficient values in overlapping frequency bands, which has a non-trapezium shape, however otherwise has the same characteristics as the window function $W_1$ described with reference to FIG. 2A above. A window function having a non-linear shape in the transition regions (e.g. the first quarter of a sine or cosine wave) has advantageous frequency properties for certain applications.

Figure 3:
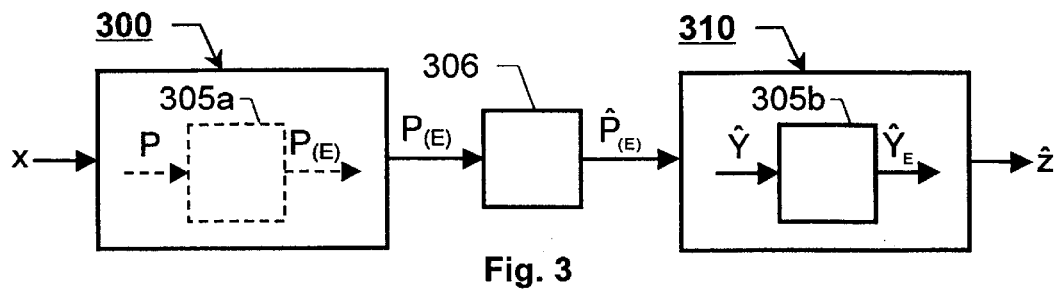
FIG. 3 shows a block diagram over a transmitter-receiver pair according to the invention.

FIG. 3 shows a general block diagram over a transmitter-receiver pair according to the invention. The transmitter 300 encodes an acoustic source signal x into an encoded representation $P_{(E)}$, which is transmitted over a transmission medium 306 to the receiver 310.

The transmitter 300 includes a coding arrangement to produce at least a basic coded signal P that represents perceptually significant characteristics of the acoustic signal x. It is possible for a receiver 310 to reconstruct an estimate $\hat{z}$ of the acoustic source signal x directly from an estimate of the basic coded signal P. However, according to a preferred embodiment of the invention, the transmitter 300 also includes a first spectral smoothing unit 305a, which receives at least one of the signal components on which the basic coded signal P is based and generates in response thereto a corresponding smoothed signal component. An enhanced coded signal $P_{(E)}$ is produced from i.a. the corresponding smoothed signal component. The enhanced coded signal $P_{(E)}$ constitutes an improved representation of the acoustic source signal x from which a perceptually improved estimate $\hat{z}$ of the acoustic source signal x can be reconstructed by the receiver 310. The first spectral smoothing unit 305a produces the corresponding smoothed signal from the at least one signal component of the basic coded signal P by selectively modifying the signal component's spectrum such that a variation is reduced in coefficient values of the spectrum, which represent frequency information above a threshold value. The first spectral smoothing unit 305a thus modifies the signal component's spectrum in a manner corresponding to the modification of the primary decoded spectrum $\hat{Y}$ described with reference to the FIGS. 1A–1C above.

The enhanced coded signal $P_{(E)}$ is sent over the transmission medium 306 and is received by the receiver 310 as an estimate of the enhanced coded signal $P_{(E)}$ in the form of a transmitted enhanced coded signal $\hat{P}_{(E)}$. The transmitted enhanced coded signal $\hat{P}_{(E)}$ is utilised by the receiver 310 for reconstructing a perceptually improved estimate $\hat{z}$ of the acoustic source signal x by means of a second spectral smoothing unit 305b. The second spectral smoothing unit 305b produces the perceptually improved estimate $\hat{z}$ of the acoustic source signal x by selectively modifying a primary spectrum $\hat{Y}$ decoded from the transmitted enhanced coded signal $\hat{P}_{(E)}$ such that a variation is reduced in coefficient values of a smoothed primary decoded spectrum $\hat{Y}_E$, which represent frequency information above a threshold value.

Figure 4:
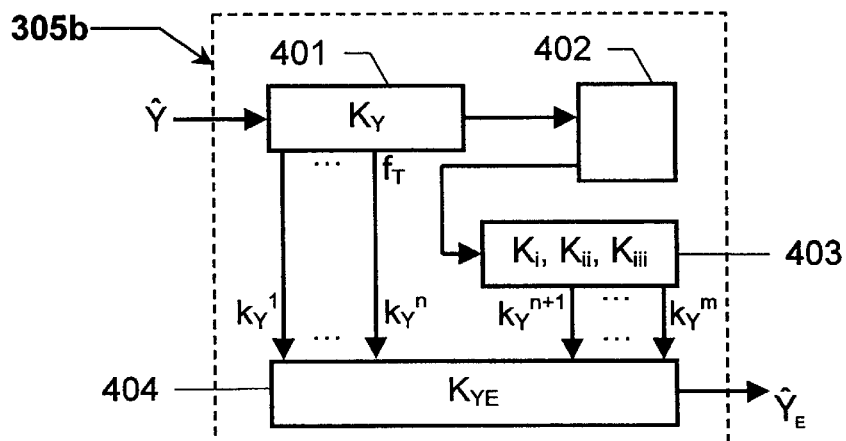
FIG. 4 shows a block diagram over a spectral smoothing unit according to a first embodiment of the invention.

FIG. 4 shows a block diagram over the spectral smoothing units 305a respective 305b in the FIG. 3 designed according to a first embodiment of the invention. For reasons of simplicity, however, reference is only made to the variables of the second spectral smoothing unit 305b. The spectral smoothing unit 305b includes a first buffer memory 401 in which coefficients $K_Y$, each representing a frequency component, of the primary decoded spectrum $\hat{Y}$ are stored. A processing unit 402 receives coefficients $k_Y^{n+1}$–$k_Y^m$ from the first buffer memory 401 corresponding to frequency components above a threshold value $f_T$ and calculates an average coefficient value $K_i$, $K_{ii}$; $K_{iii}$ of these coefficients $k_Y^{n+1}$–$k_Y^m$ for each of at least one frequency band i, ii and iii. Each of the calculated average coefficient values $K_i$, $K_{ii}$; $K_{iii}$ are then repeatedly stored in a second buffer memory

403 a number of times being equal to the number of coefficients $K_Y$, of the primary decoded spectrum $\hat{Y}$ in the particular frequency band i, ii and iii. The purpose of this storage is to make possible a swift replacement of the coefficients $K_Y$, of the primary decoded spectrum $\hat{Y}$ with the relevant average coefficient values $K_i$, $K_{ii}$; $K_{iii}$. The replacement of coefficients is accomplished by means of a read-out unit 404 reading out coefficients $k_Y^1$–$k_Y^n$ up to the threshold value $f_T$ from the first buffer memory 401 and reading out smoothed coefficients $k_Y^{n+1}$–$k_Y^m$ above the threshold value $f_T$ from the second buffer memory 403. These coefficients $k_Y^1$–$k_Y^n$, $K_i$, $K_{ii}$; $K_{iii}$ then together form the coefficients $K_{YE}$ of the smoothed primary decoded spectrum $\hat{Y}_E$ being provided on an output from the read-out unit 404.

Figure 5:
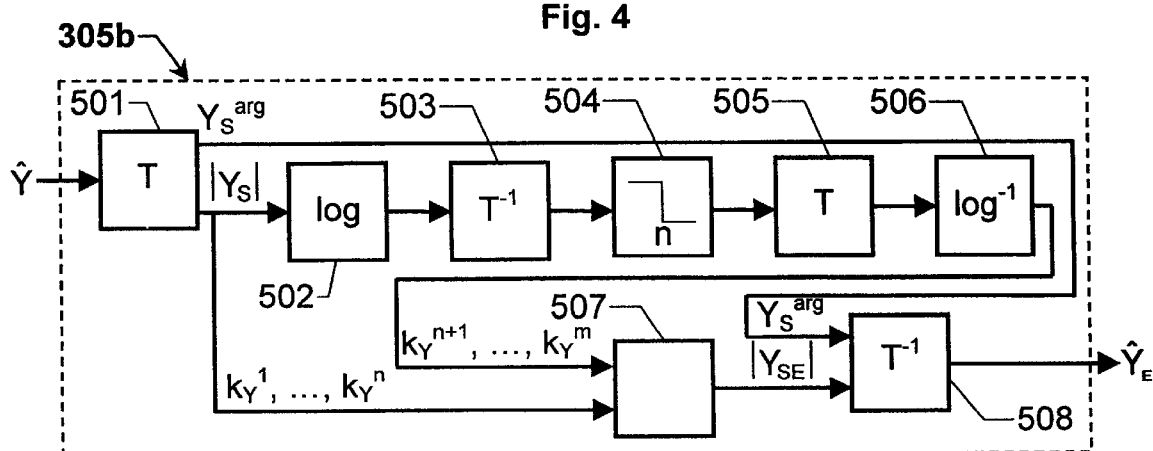
FIG. 5 shows a block diagram over a spectral smoothing unit according to a second embodiment of the invention.

FIG. 5 shows a block diagram over the spectral smoothing units 305a respective 305b in the FIG. 3 designed according to a second embodiment of the invention. Again, for reasons of simplicity, reference is also here only made to the variables of the second spectral smoothing unit 305b.

The spectral smoothing unit 305b includes a first transformer 501 for receiving the primary spectrum $\hat{Y}$ via an input. The first transformer 501 produces a corresponding angular spectrum $Y_s^{arg}$ on a first output and a corresponding magnitude spectrum $|Y_s|$ on a second output. The magnitude spectrum $|Y_s|$ is represented by coefficient values $k_Y^1, \ldots, k_Y^m$. Optionally, the spectral smoothing unit 305b includes a logarithmic transformer 502, which receives those coefficients $k_Y^{n+1}, \ldots, k_Y^m$ of the magnitude spectrum $|Y_s|$ representing frequency components above the threshold frequency $f_T$, while coefficients $k_Y^1, \ldots, k_Y^n$ of the magnitude spectrum $|Y_s|$ representing lower frequency components are forwarded to a combiner 507. The logarithmic transformer 502 receives the coefficients $k_Y^{n+1}, \ldots, k_Y^m$ of the magnitude spectrum $|Y_s|$ representing frequency components above the threshold frequency $f_T$ on an input and provides in response thereto a logarithmic transform on an output. A first inverse transformer 503 receives this transformed part of the magnitude spectrum on an input and provides, on an output and in response thereto, a cepstrum-coded signal having a set of cepstral coefficients of which each represents a component in the cepstral domain. In case no logarithmic transformer 502 is included, the coefficients $k_Y^{n+1}, \ldots, k_Y^m$ of the magnitude spectrum $|Y_s|$ are fed directly from the first transformer 501 to first inverse transformer 503. A following discarding unit 504 discards cepstral coefficients of an order n and higher in the cepstrum coded signal, replaces the discarded coefficients with zero valued coefficients and delivers the signal further to a second transformer 505, which produces a corresponding spectrum signal.

This spectrum signal is then logarithmically inverse transformed in a subsequent inverse logarithmic transformer 506 if a corresponding logarithmic transform earlier has been performed by a logarithmic transformer 502. The inverse logarithmic transformer 506 produces logarithmically smoothed coefficients $k_Y^{n+1}$–$k_Y^m$. Thus, either smoothed coefficients $k_Y^{n+1}$–$k_Y^m$ from the second transformer 505 or logarithmically smoothed coefficients $k_Y^{n+1}$–$k_Y^m$ from the inverse logarithmic transformer 506 are forwarded to the combiner 507 together with the coefficients $k_Y^1, \ldots, k_Y^n$ of the magnitude spectrum $|Y_s|$ representing frequency components below the threshold frequency $f_T$. The combiner provides in response to the coefficients $k_Y^1, \ldots, k_Y^n$ and the smoothed coefficients $k_Y^{n+1}$–$k_Y^m$ a smoothed magnitude spectrum $|Y_{SE}|$. A second reverse transformer 508 receives the angular spectrum $Y_s^{arg}$ on a first input and the smoothed magnitude spectrum $|Y_{SE}|$ on a second input and produces in response thereto an enhanced coded signal $\hat{Y}_E$ on an output.

Figure 6A:
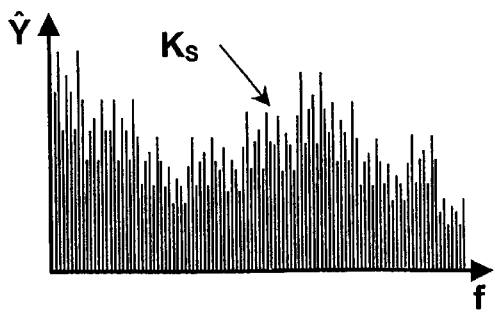
FIG. 6A shows a frequency diagram over intermediate coefficients of a primary decoded spectrum to be further encoded by a spectral smoothing unit according to a second embodiment of the invention.

FIG. 6A shows, in a (logarithmic) magnitude spectrum diagram, an example of spectral coefficients $K_S$ of a primary decoded spectrum $\hat{Y}$. As can be seen in the diagram, the primary decoded spectrum $\hat{Y}$ contains coefficients with large variations between neighbouring coefficients $K_S$. Since such variation is undesirable in the higher end of the frequency band for a representation of acoustic information, this variation is reduced in a spectral smoothing unit 305b as described above with reference to FIG. 5. The spectral smoothing unit 305b receives the primary decoded spectrum $\hat{Y}$ and thus provides a smoothed primary decoded spectrum $\hat{Y}_E$ in which the variation is reduced in coefficient values $K_{YE}$ representing frequency information above a threshold value $f_T$. The variable n of the discarding unit 504 is namely chosen to such value that a variation be reduced in the coefficient values $K_{YE}$ of the smoothed primary decoded spectrum $\hat{Y}_E$, which represent frequency information above the threshold value $f_T$ (corresponding to a spectral index $K_Y^n$).

Figure 6B:
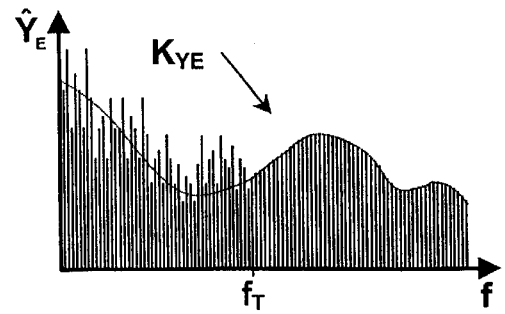
FIG. 6B shows in a frequency diagram the coefficients of a smoothed decoded spectrum derived according to the second embodiment of the invention.

FIG. 6B shows, in a frequency diagram, the magnitude spectral coefficients $K_S$ of the primary decoded spectrum $\hat{Y}$ in FIG. 6A after having been modified by the spectral smoothing unit 305b into representing coefficient values $K_{YE}$ of a corresponding smoothed primary decoded spectrum $\hat{Y}_E$.

As an alternative to the cepstrum transformation and the following discarding of high-order coefficients in the cepstrum coded signal the spectral smoothing can be accomplished by linear low pass filtering of spectral coefficients representing the primary spectrum $\hat{Y}$ or by median filtering spectral coefficients of the primary spectrum $\hat{Y}$ representing frequency components above the threshold value $f_T$.

Figure 7:
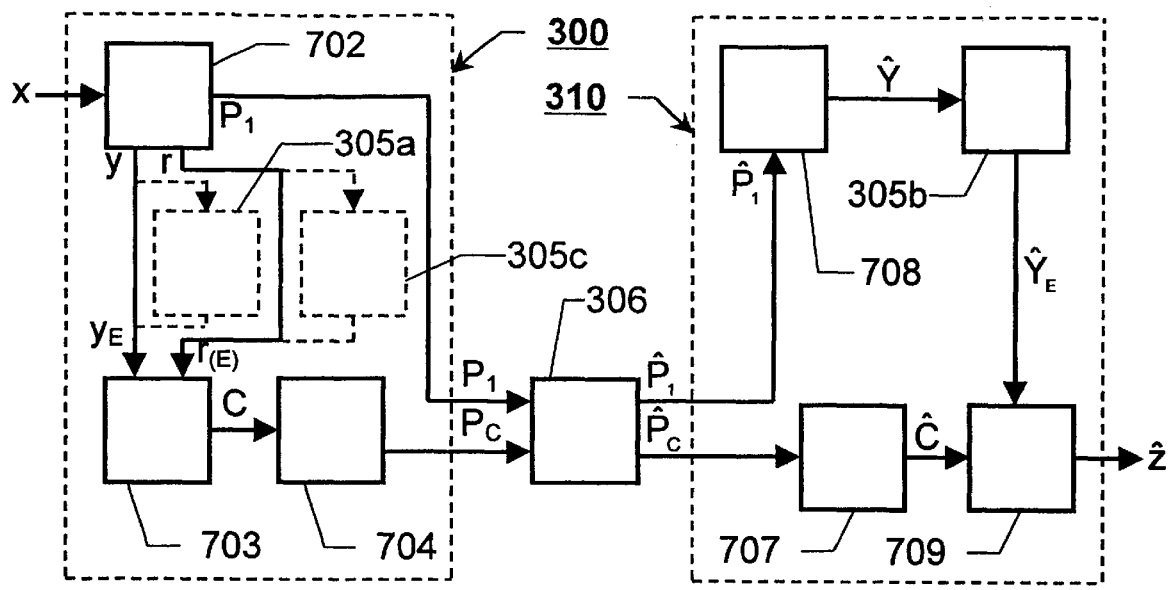
FIG. 7 shows a block diagram over a communication system according to an embodiment of the invention.

FIG. 7 shows a block diagram over a communication system according to an embodiment of the invention by means of which an acoustic source signal x can be transmitted from a first node as a low-bit rate encoded signal to a second node, where it is reconstructed into an estimate $\hat{z}$ of the acoustic source signal x. The system comprises a transmitter 300, a transmission medium 306 and a receiver 310.

The transmitter 300 in turn includes a signal coder 702, which has an input for receiving the acoustic source signal x and an output for providing a basic coded signal $P_1$ representing perceptually significant characteristics of the acoustic signal x. The signal coder 702, also provides a target signal r that represents a filtered (in a general sense) version of the acoustic source signal x and a primary coded signal y that represents a reconstructed signal based on the basic coded signal $P_1$. Either none, one or both of the target signal r and the primary coded signal y are spectrally smoothed in a spectral smoothing unit 305a respective 305c according to the above-described method.

According to a preferred embodiment of the invention a first spectral smoothing unit 305a receives the primary coded signal y and produces a smoothed primary coded signal $y_E$ in response thereto. Nevertheless, an additional spectral smoothing unit 305c may also be included in the transmitter to receive the target signal r and correspondingly produce a smoothed target signal $r_E$. According to another preferred embodiment of the invention only the spectral smoothing unit 305c, which improves the target signal r is included (and not the spectral smoothing unit 305a, which improves the primary coded signal y). These different embodiments of the invention are indicated in the FIG. 7 by dashed lines and dashed boxes.

Both the spectral smoothing units 305a and 305c operate in accordance with the method according to the invention described above so as to produce a smoothed primary coded signal $y_E$ (and possibly a smoothed target signal $r_E$) by reducing the variation in spectral coefficient values of the signal(s) representing frequency information above a threshold value $f_T$.

An equalisation coder 703 in the transmitter 300 receives the smoothed primary coded signal $y_E$ and the (possibly smoothed) target signal $r_{(E)}$. The equalisation coder 703 transforms the (possibly smoothed) target signal $r_{(E)}$ respective the smoothed primary coded signal $y_E$ into the frequency domain and calculates a ratio spectrum C between the spectra of the transformed signals to represent a logarithmic spectral difference between the (possibly smoothed) target signal $r_{(E)}$ and the smoothed primary coded signal $y_E$. The magnitude of the ratio spectrum C thus indicates how well the first coded signal $P_1$ describes the acoustic signal x.

The ratio spectrum C is provided on an output from the equalisation coder 703 and forwarded to a quantiser 704, which provides on its output a secondary coded signal $P_C$ in response to the ratio signal C. The secondary coded signal $P_C$ represents a discrete and quantised signal containing a set of coefficients.

Finally, the transmitter 300 comprises an output unit (not shown) being devised to deliver the first coded signal $P_1$ respective the secondary coded signal $P_C$ to the transmission medium 306. In case at least one of the transmitter 300 and the receiver 310 is mobile the transmission medium 306 is normally, at least in part, constituted by one or more radio resources. Naturally, any other type of transmission medium adapted for fixed or mobile communication is equally well applicable according to the invention.

The receiver 310 then receives estimates of the signals $P_1$, $P_C$ as a first transmitted signal $\hat{P}_1$ representing the first coded signal $P_1$ respective a second transmitted signal $\hat{P}_C$ representing the secondary coded signal $P_C$. The first transmitted signal $\hat{P}_1$ and the second transmitted signal $\hat{P}_C$ are utilised by the receiver 310 for reconstructing a perceptually improved estimate $\hat{z}$ of the acoustic source signal x. In order to perform this, the receiver 310 includes an equalisation decoder 707, a reconstruction unit 708, a spectral smoothing unit 305*b* and an equaliser 709.

The reconstruction unit 708 receives the first transmitted signal $\hat{P}_1$ via an input and generates in response thereto a primary decoded spectrum $\hat{Y}$, representing an estimate of the spectrum of the acoustic source signal x, on its output. The primary decoded spectrum $\hat{Y}$ is forwarded to the spectral smoothing unit 305*b*. This unit 305*b* produces a smoothed primary decoded spectrum $\hat{Y}_E$ according to the proposed method.

The equalisation decoder 707 receives the second transmitted signal $\hat{P}_C$ and provides in response thereto an estimated equalisation spectrum $\hat{C}$ on its output. The estimated equalisation spectrum $\hat{C}$ is forwarded to the equaliser 709 together with the smoothed primary decoded spectrum $\hat{Y}_E$. The equaliser 709 performs a multiplication between the estimated equalisation spectrum $\hat{C}$ and the smoothed primary decoded spectrum $\hat{Y}_E$. The equaliser 709 then generates an inverse transform of the result from the multiplication to form a signal in the time domain. This signal constitutes the improved estimate $\hat{z}$ of the source signal x and is delivered on an output of the equaliser 709.

The improved estimate $\hat{z}$ could also constitute an indirect representation of the source signal x. For instance, in the case of a linear predictive coder the improved estimate $\hat{z}$ would instead be an excitation signal, from which an estimate of the source signal x would be produced via a synthesis filter.

Since the codecs in many coding systems (e.g. GSM EFR-coder and AMR-coder) operate block-wise on a speech signal being segmented into frames or sub-frames it is preferable to apply the equalisation operator C (approximated by the estimated equalisation spectrum $\hat{C}$) in a block-wise manner corresponding to the segmentation of the speech signal (GSM=Global system for Mobile Communication; EFR=Enhanced Full Rate; AMR=Adaptive Multi-Rate). Of course, the same is true for the frequency transform $Y_E$ representing an estimated smoothed spectrum of the source signal x.

Figure 8:
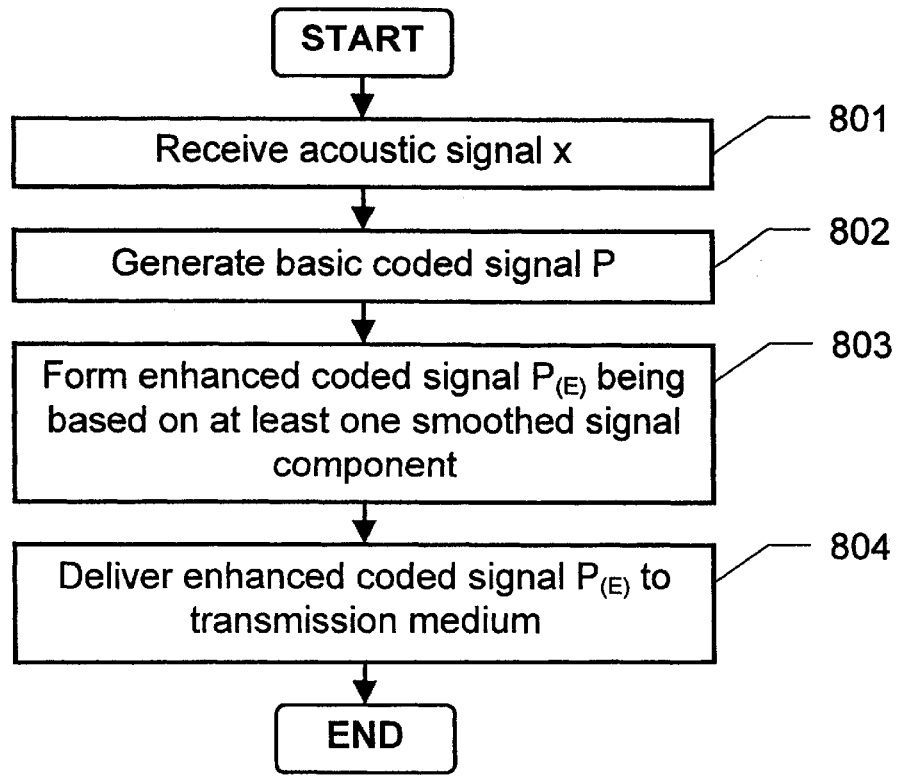
FIG. 8 illustrates, by means of a flow diagram, a general method of encoding an acoustic signal according to the invention.

FIG. 8 illustrates, by means of a flow diagram, a general method of encoding an acoustic signal according to the invention. A first step 801 receives the acoustic signal x. A basic coded signal P representing perceptually significant characteristics of the acoustic signal x is generated in a following step 802. A subsequent step 803, reduces a variation in coefficient values of at least one of the signal components on which the basic coded signal P is based and generates in response thereto a corresponding smoothed signal component. An enhanced basic coded signal $P_{(E)}$ is produced from i.a. the corresponding smoothed signal component. Finally, in a step 804, the enhanced coded signal P is delivered to a transmission medium for transmission to a receiver.

Figure 9:
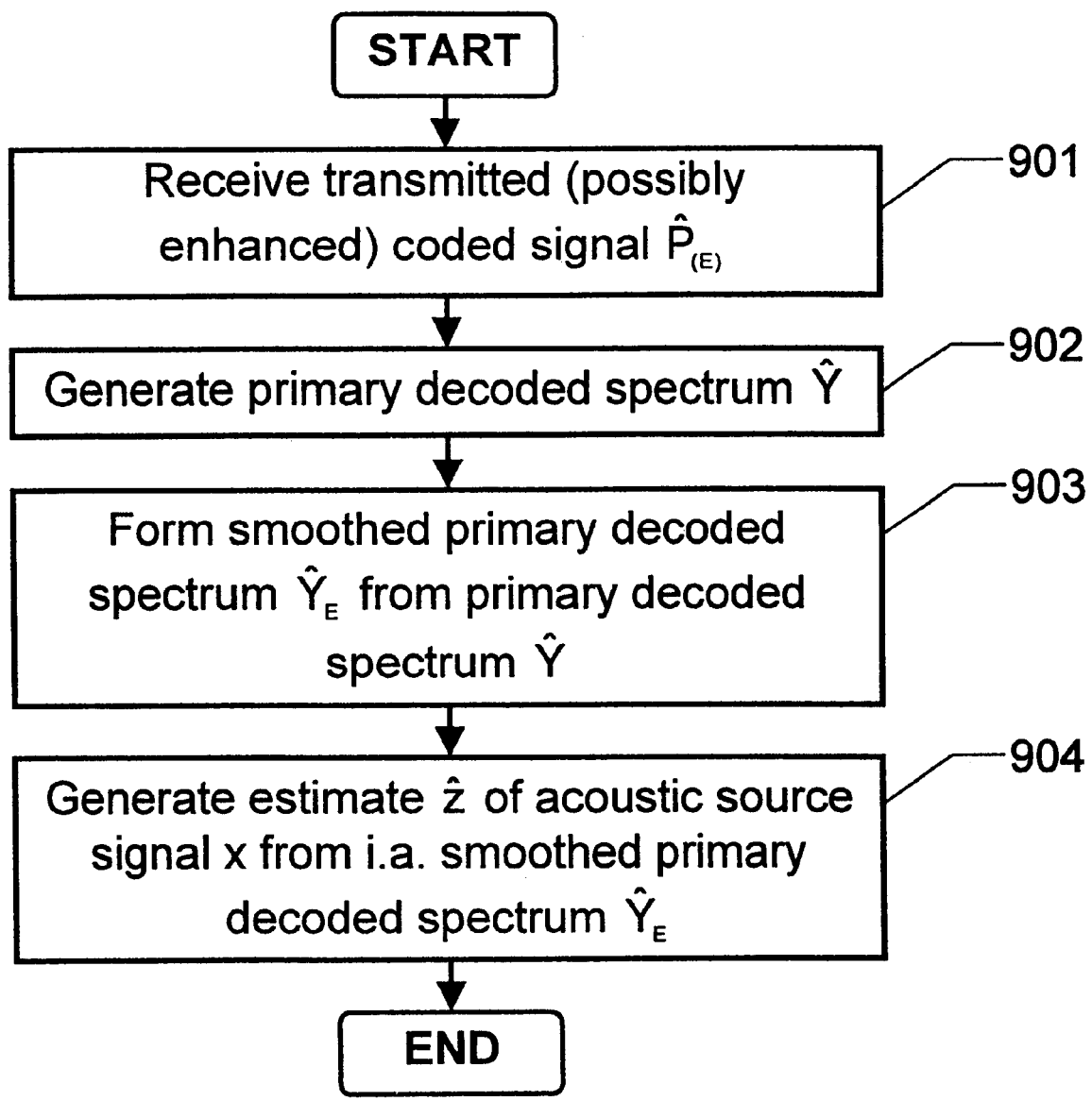
FIG. 9 illustrates, by means of a flow diagram, a general method of decoding encoded information into an estimate of an acoustic signal according to the invention.

FIG. 9 illustrates, by means of a flow diagram, a general method of decoding encoded information into an estimate of an acoustic signal according to the invention. A first step 901 receives at least one transmitted (possibly enhanced) coded signal $\hat{P}_{(E)}$ from a transmission medium. A primary decoded spectrum $\hat{Y}$ is then generated in a following step 902 from the at least one transmitted (possibly enhanced) coded signal $\hat{P}_{(E)}$. Subsequently, a smoothed primary decoded spectrum $\hat{Y}_E$ is formed from the primary decoded spectrum $\hat{Y}$ in a step 903. Finally, a step 904 generates an estimate $\hat{z}$ of a source signal on basis of at least the smoothed primary decoded spectrum $\hat{Y}_E$. The estimate $\hat{z}$ has a high perceived sound quality to a human listener.

The above proposed embodiments of the invention have all involved operations in the frequency domain. However, according to a preferred embodiment of the invention corresponding actions can be taken in the time domain, namely by dividing a signal representing an acoustic source signal into at least two different signal components by means of sub-band filters. The signal components are then individually power adjusted to obtain the desired smoothing. Subsequently, the power adjusted signal components are combined into a single smoothed basic coded signal that thus constitutes a representation of the acoustic source signal in which a frequency variation is reduced for signal components above a threshold frequency.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A method of encoding an acoustic source signal to produce encoded information for transmission over a transmission medium, comprising:

producing, in response to the acoustic source signal,
a basic coded signal representing perceptually significant characteristics of the acoustic signal;

a target signal representing a filtered version of the acoustic source signal; and a primary coded signal representing a reconstructed signal based on the basic coded signal;

producing, in response to at least one of the primary coded signal and the target signal a corresponding smoothed signal constituting a perceptually improved representation of the primary coded signal respective the target signal; and producing a secondary coded signal on basis of a combination of either:

the smoothed primary coded signal and the target signal;

the primary coded signal and the smoothed target signal; or the smoothed primary coded signal and the smoothed target signal, wherein:

the primary coded signal comprises coefficients of which each coefficient represents a frequency component;

the target signal comprises coefficients of which each coefficient represents a frequency component; and the corresponding smoothed signals are selectively modified versions of the primary coded signal respective the target signal wherein a variation is reduced in the coefficient values representing frequency information above a threshold value.

2. A method according to claim 1, wherein smoothed primary coded signal is derived from the primary coded signal by:

dividing the coefficients of the primary coded signal representing frequency components above the threshold value into one or more frequency bands;

calculating an average coefficient value for the coefficients within the respective frequency band; and replacing the coefficients within each frequency band with the respective average coefficient value.

3. A method according to claim 2, wherein the frequency bands are equidistant.

4. A method according to claim 2, wherein the frequency bands are at least partly overlapping.

5. A method according to claim 4, wherein resulting coefficient values in the overlapping regions of the frequency bands are derived by:

multiplying each frequency band with a window function to obtain corresponding windowed frequency bands; and adding coefficient values of neighboring windowed frequency bands in each region of overlap.

6. A method according to claim 5, wherein the window function has a constant magnitude in non-overlapping frequency regions and having a gradually declining magnitude in an upper and a lower transition region where neighbouring frequency bands overlap.

7. A method according to claim 1, wherein that the selective modification of the primary coded signal involves:

producing a cepstrum coded signal having a set of cepstral coefficients of which each represents a component in the cepstral domain; and discarding of cepstral coefficients in the cepstrum coded signal of a specific order and higher.

8. A method according to claim 7, wherein the specific order is chosen such that a variation is reduced in coefficient values of the smoothed primary coded signal representing frequency information above the threshold value.

9. A method according to claim 1, wherein the secondary coded signal indicates how well the first coded signal describes the acoustic signal.

10. A method according to claim 9, wherein the secondary coded signal represents a spectral ratio between a target signal and the primary coded signal.

11. A method according to claim 9, wherein the secondary coded signal represents a logarithmic spectral difference between a target signal and the primary coded signal.

12. A method according to claim 10, wherein the secondary coded signal is derived by:

producing in response to the acoustic signal a frequency transformed target signal;

producing in response to the acoustic signal a frequency transformed primary coded signal;

producing a ratio spectrum between the frequency transformed target signal and the frequency transformed primary coded signal; and forming the secondary coded signal on basis of the ratio spectrum.

13. A computer program directly loadable into the internal memory of a computer, comprising software for controlling the steps of claim 1 when said program is run on the computer.

14. A computer readable medium, having a program recorded thereon, where the program is to make a computer control the steps of claim 1.

15. A method of decoding an estimate of a representation of an acoustic source signal from encoded information having been transmitted over a transmission medium, comprising:

receiving at least one transmitted coded signal representing an estimate of the at least one coded signal;

decoding at least one primary decoded spectrum from the at least one transmitted coded signal;

producing a smoothed primary decoded spectrum from the at least one primary decoded spectrum; and producing the estimate of the acoustic source signal at least on basis of the smoothed primary decoded spectrum, wherein:

the smoothed primary decoded spectrum comprises coefficients of which each coefficient represents a frequency component, the smoothed primary decoded spectrum is a selectively modified version of one of the at least one primary decoded spectrum wherein a variation is reduced in the coefficient values representing frequency information above a threshold value.

16. A method according to claim 15, wherein the representation of the acoustic source signal constitutes the acoustic source signal itself.

17. A method according to claim 15, wherein the representation of the acoustic source signal constitutes an excitation signal from which the acoustic source signal can be derived.

18. A method according to claim 15, wherein the smoothed primary decoded signal is derived from the at least one primary decoded spectrum by:

dividing the coefficients of one of the at least one primary decoded spectrum representing frequency components above the threshold value into one or more frequency bands;

calculating an average coefficient value for the coefficients within the respective frequency band; and replacing the coefficients within each frequency band with the respective average coefficient value.

19. A method according to claim 18, wherein the frequency bands are equidistant.

20. A method according to claim 18, wherein the frequency bands are at least partly overlapping.

21. A method according to claim 20, wherein resulting coefficient values in the overlapping regions of the frequency bands are derived by:
   multiplying each frequency band with a window function to obtain corresponding windowed frequency bands; and
   adding coefficient values of neighboring windowed frequency bands in each region of overlap.

22. A method according to claim 21, wherein the window function has a constant magnitude in non-overlapping frequency regions and has a gradually declining magnitude in an upper and a lower transition region where neighboring frequency bands overlap.

23. A method according to claim 15, wherein that the selective modification of the at least one primary decoded spectrum involves:
   producing a cepstrum coded signal having a set of cepstral coefficients of which each represents a component in the cepstral domain; and
   discarding of cepstral coefficients in the cepstrum coded signal of a specific order and higher.

24. A method according to claim 23, wherein the specific order is chosen such that a variation is reduced in coefficient values of the smoothed primary decoded spectrum representing frequency information above the threshold value.

25. A method according to claim 15, wherein the at least one transmitted enhanced coded signal comprises:
   a first estimate of a first coded signal constituting a coded representation of the acoustic signal; and
   a second estimate of a secondary coded signal indicates how well the first coded signal describes the acoustic signal.

26. A method according to claim 25, wherein the secondary coded signal represents a ratio between a spectrum of a target signal and a spectrum of a primary coded signal.

27. A method according to claim 25, wherein the secondary coded signal represents a difference logarithmic spectrum of a target signal and a logarithmic spectrum of a primary coded signal.

28. A method according to claim 25, wherein the estimate of the acoustic source signal is derived by:
   producing in response to the first estimate the at least one primary decoded spectrum;
   producing in response to the at least one primary decoded spectrum the smoothed primary decoded spectrum;
   producing in response to the second estimate an equalization spectrum; and
   producing the estimate of the acoustic source signal in response to the equalization spectrum and the smoothed primary decoded spectrum.

29. A computer program directly loadable into the internal memory of a computer, comprising software for controlling the steps of claim 15 when said program is run on the computer.

30. A computer readable medium, having a program recorded thereon, where the program is to make a computer control the steps of claim 15.

31. A transmitter for encoding an acoustic source signal to produce encoded information for transmission over a transmission medium, comprising:
   a primary coder having an input to receive the acoustic source signal and having a first output for providing a basic coded signal representing perceptually significant characteristics of the acoustic signal from which an estimate of the acoustic source signal can be reconstructed, a second output for providing a target signal representing a filtered version of the acoustic source signal, a third output for providing a primary coded signal representing a reconstructed signal based on the basic coded signal;
   at least one spectral smoothing unit for producing, in response to the primary coded signal, a smoothed primary coded signal constituting a perceptually improved representation of the primary coded signal;
   a quantizer for producing a secondary coded signal on basis of the smoothed primary coded signal and the target signal, wherein:
      the at least one spectral smoothing unit is devised to produce a smoothed output signal from the primary coded signal by selectively modifying the primary coded signal such that a variation is reduced in coefficient values thereof representing frequency information above a threshold value.

32. A transmitter according to claim 31, wherein the at least one spectral smoothing unit comprises:
   a first buffer memory to store coefficients of the input signal, each coefficient representing a frequency component;
   a processing unit to calculate, for coefficients corresponding to frequency components above the threshold value, an average coefficient value of the coefficients stored in the first buffer memory for each of at least one frequency band;
   a second buffer memory to repeatedly store the respective average coefficient value for the each frequency band as many times as there are corresponding coefficients of the at least one basic coded signal in the particular frequency band; and
   a read-out unit to read out coefficients up to the threshold value from the first buffer memory and to read out coefficients above the threshold value from the second buffer memory to form the coefficients of the output signal.

33. A transmitter according to claim 32, wherein the frequency bands are equidistant.

34. A transmitter according to claim 32, wherein the frequency bands are at least partly overlapping.

35. A transmitter according to claim 34, further comprising coefficient combiner to derive resulting coefficient values in the overlapping regions of the frequency bands by:
   multiplying each frequency band with a window function to obtain corresponding windowed frequency bands; and
   adding coefficient values of neighboring windowed frequency bands in each region of overlap.

36. A transmitter according to claim 35, wherein the window function has a constant magnitude in non-overlapping frequency regions and has a gradually declining magnitude in an upper and a lower transition region where neighboring frequency bands overlap.

37. A receiver for decoding an estimate of a representation of an acoustic source signal from encoded information received from a transmission medium, comprising a spectral smoothing unit having an input to receive a primary decoded spectrum being derived from the received encoded information and an output to provide a smoothed primary decoded spectrum, wherein the smoothed primary decoded spectrum comprises coefficients of which each coefficient represents a frequency component, the spectral smoothing unit being devised to produce the smoothed primary decoded spectrum by selectively modifying the primary decoded spectrum such that a variation is reduced in coefficient values representing frequency information above a threshold value.

38. A receiver according to claim 37, further comprising:
- a reconstruction unit having an input to receive a first transmitted signal in the encoded information and an output to provide the primary decoded spectrum;
- an equalization decoder having an input to receive a second transmitted signal in the encoded information and an output to provide an estimated equalization spectrum; and
- an equalizer having a first input to receive the smoothed primary decoded spectrum, a second input to receive the estimated equalization spectrum and an output to provide the estimate of the acoustic source signal.

39. A receiver according to claim 38, wherein the spectral smoothing unit comprises:
- a first buffer memory to store coefficients of the primary decoded spectrum, each coefficient representing a frequency component;
- a processing unit to calculate, for coefficients corresponding to frequency components above the threshold value, an average coefficient value of the coefficients stored in the first buffer memory for each of at least one frequency band;
- a second buffer memory to repeatedly store the respective average coefficient value for the each frequency band as many times as there are corresponding coefficients of the at least one basic coded signal in the particular frequency band; and
- a read-out unit to read out coefficients up to the threshold value from the first buffer memory and to read out coefficients above the threshold value from the second buffer memory to form the coefficients of the smoothed primary decoded spectrum.

40. A receiver according to claim 39, wherein the frequency bands are equidistant.

41. A receiver according to claim 39, wherein the frequency bands are at least partly overlapping.

42. A receiver according to claim 41, further comprising a coefficient combiner to derive resulting coefficient values in the overlapping regions of the frequency bands by:
- multiplying each frequency band with a window function to obtain corresponding windowed frequency bands; and
- adding coefficient values of neighboring windowed frequency bands in each region of overlap.

43. A receiver according to claim 42, wherein the window function has a constant magnitude in non-overlapping frequency regions and has a gradually declining magnitude in an upper and a lower transition region where neighboring frequency bands overlap.

44. A communication system for transmission of an acoustic source signal from a first node to a second node, comprising:
- a transmitter for encoding the acoustic source signal to produce encoded information according to claim 31;
- a receiver having an input to receive the encoded information produced by the transmitter and decoding the encoded information into an estimate of the acoustic source signal; and
- a transmission medium for transmitting the at least one enhanced coded signal from the transmitter to the receiver, wherein the receiver comprises:
  - a spectral smoothing unit having an input to receive a primary decoded spectrum being derived from the received encoded information and an output to provide a smoothed primary decoded spectrum, wherein the smoothed primary decoded spectrum comprises coefficients of which each coefficient represents a frequency component, the spectral smoothing unit being devised to produce the smoothed primary decoded spectrum by selectively modifying the primary decoded spectrum such that a variation is reduced in coefficient values representing frequency information above a threshold value.

* * * * *